United States Patent [19]

Lyaudet et al.

[11] Patent Number: 4,587,109

[45] Date of Patent: May 6, 1986

[54] PROCESS FOR THE SEPARATE RECOVERY OF MOLYBDENUM AND VANADIUM

[75] Inventors: Georges Lyaudet; Jean Vial, both of Limoges, France

[73] Assignee: Compagnie Generale des Matieres Nucleaires (COGEMA), France

[21] Appl. No.: 512,005

[22] Filed: Jul. 8, 1983

Related U.S. Application Data

[63] Continuation of Ser. No. 306,723, Sep. 29, 1981, abandoned.

[30] Foreign Application Priority Data

Oct. 3, 1980 [FR] France ................. 80 21288

[51] Int. Cl.$^4$ ............. C01G 43/00; C01G 39/02; C01G 31/02
[52] U.S. Cl. ......................... 423/15; 423/17; 423/56; 423/67
[58] Field of Search .................. 423/11, 15, 17, 56, 423/61, 67, 68, 3, 18

[56] References Cited

U.S. PATENT DOCUMENTS

| | | | |
|---|---|---|---|
| 2,949,339 | 8/1960 | Marvin | 423/17 |
| 3,288,570 | 11/1966 | Henrickson | 423/17 X |
| 3,773,890 | 11/1973 | Fox et al. | 423/61 X |
| 4,061,711 | 12/1977 | Morgan et al. | 423/68 X |
| 4,145,397 | 3/1979 | Toida et al. | 423/68 X |
| 4,273,745 | 6/1981 | Laferty et al. | 423/11 X |
| 4,423,013 | 12/1983 | Maurel et al. | 423/11 X |
| 4,432,947 | 2/1984 | Maurel | 423/11 X |

Primary Examiner—Deborah L. Kyle
Assistant Examiner—Matthew A. Thexton
Attorney, Agent, or Firm—Larson and Taylor

[57] ABSTRACT

The invention relates to a process for recovering and purifying the molybdenum from a solution containing more molybdenum than vanadium.

The process of the invention comprises the step of contacting the solution which contains molybdenum and vanadium, originally at a pH at least equal to 11 with an excess of an ammonium salt sufficient to precipitate the greatest part of vanadium in the form of solid ammonium vanadate, this excess being yet hot higher than a value such that after precipitation of vanadium, the quantity of ammonium having not reacted with the vanadate would be over a concentration which would account for risks of precipitating also molybdenum which is contained in the liquid phase of the supernatant.

The molybdenum which is obtained is of industrial grade.

28 Claims, 1 Drawing Figure

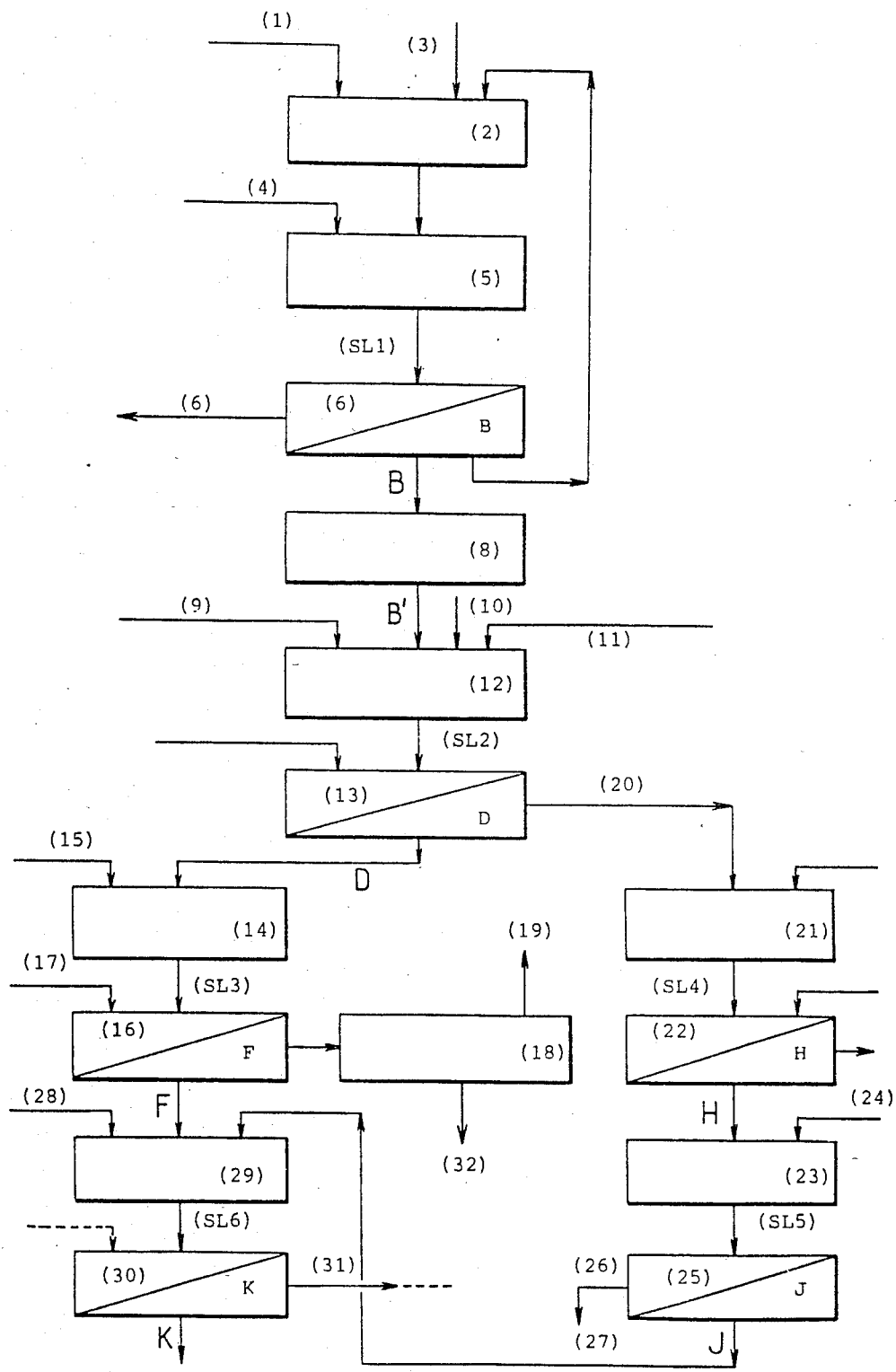

PROCESS FOR THE SEPARATE RECOVERY OF MOLYBDENUM AND VANADIUM

This is a continuation of application Ser. No. 306,723 filed Sept. 29, 1981 now abandoned.

The invention relates to a process for recovering separately the molybdenum and the vanadium from a solution which contains them in the state of soluble salts, more particularly in the form of metal molybdates and vanadates, particularly of alkali metals, such as potassium and preferably sodium.

From a more general point of view, the aim of the invention is to provide a process for recovering separately the molybdenum and the vanadium from a solid-liquid mixture derived particularly from a uraniferous ore containing molybdenum and vanadium and possibly phosphorous and sulfur or again from "concentrates" of effluents obtained after the extraction of uranium, from uraniferous liquors of the type which result from uranium ores by acid or alkaline processing, by known processes, these effluents possibly containing traces of uranium.

In certain uraniferous deposits, molybdenum is found in a percentage which can reach 50% of the uranium content; the said deposits often contain vanadium, as well as molybdenum.

The simultaneous presence of molybdenum and of vanadium, in the same ore, is rare and the fact that the molybdenum and the vanadium are metals close to one another in the periodic classification of the elements, suggests difficulties in separating them.

Now, molybdenum is a valuable metal both from the economic point of view and from the industrial point of view; at the present day, for the most part, molybdenum is obtained from molybdenum sulfide; the residues which after the extraction of the uranium contain molybdenum, represent an important source of molybdenum.

The molybdenum must, besides, be very pure to be used in metallurgy; it must therefore be free from the elements which contaminate it and which are essentially constituted by uranium, vanadium, phosphorus and sulfur.

For all these reasons, the Applicant Company is engaged in resolving the problem of the separation of molybdenum and of vanadium as well as that of the recovery of the molybdenum by means of a simple and effective process.

One of the objects of the invention is hence to provide such a process to recover the molybdenum and the vanadium, from a solution containing them.

Another object of the invention is to provide a process enabling the molybdenum and the vanadium to be recovered from a liquid-solid mixture containing molybdenum, vanadium and other elements such as uranium, phosphorus and sulfur.

Another object of the invention is to provide a process enabling to separate and purify molybdenum from a solution containing more molybdenum than vanadium.

SUMMARY OF THE INVENTION

The process according to the invention for recovering and purifying molybdenum from an initial solution containing more molybdenum than vanadium in the state respectively of molybdate and vanadate of metals, notably alkali metals, is characterized by contacting this solution, originally at a pH at least equal to 11 or previously brought to this pH, with an excess of an ammonium salt sufficient to precipitate the greatest part of vanadium in the form of solid ammonium vanadate, this excess being yet not higher than a value such that after precipitation of vanadium, the quantity of ammonium having not reacted with the vanadate and expressed in moles of ammonium ions would be over a concentration which would account for risks of precipitating also molybdenum which is contained in the liquid phase of the supernatant.

BRIEF DESCRIPTION OF DRAWING

FIG. 1 is a diagrammatic representation of the process according to the invention. The alkaline carbonate solution starting material is processed so as to separately recover molybdenum and vanadium, and uranium values when present.

DETAILED DESCRIPTION

The invention can be advantageously resorted to in the case of solutions containing more than five moles of molybdenum, for instance about ten moles or even more, of molybdenum for one mole of vanadium.

It was observed that it would be possible, unexpectedly, to resort to this process to separate the molybdenum from the vanadium practically completely this result could not be foreseen, since if it was known that the respective solubility coefficients of ammonium molybdate and of ammonium vanadate were different, they were not sufficiently so, as to enable to expect to product a practically total separation between the molybdenum and the vanadium, other than by a series of fractional crystallisations.

Now the practising of the process according to the invention has shown surprisingly that it was unnecessary to resort to such crystallisations, the partition coefficient between the ammonium molybdate and the ammonium vanadate becoming, in fact, under the conditions of the above indicated reaction, to such a high point, that a practically complete separation of the molybdenum and of the vanadium occurs, in a single step.

After the addition of the ammonium salt according to the above mentioned conditions, the molybdenum remains in the soluble state, in the supernatant and can be recovered from this liquid phase by a liquid-solid separation, while the vanadium is to be found in its greatest part in the form of solid ammonium vanadate.

The molybdate and the vanadate salts obtained in the initial solution, are meant as being all possible mixtures of these salts. The initial solution contains advantageously a molybdate salt and a vanadate salt, preferably such that the cation associated with the molybdate is identical with the cation associated with the vanadate.

The adjustment of the pH, when it is necessary, for example when a basic medium is involved, can be done by addition of an acid; preferably, the acid used is sulfuric acid.

The chloride, the nitrate or the sulfate may be used as an ammonium salt.

Preferably, recourse is had to ammonium chloride.

The reaction according to which the vanadium precipitates in the form of the ammonium vanadate is the following:

$$XVO_3 + NH_4A \longrightarrow XA + NH_4VO_3 \downarrow$$

in which:

X denotes as cation associated with the vanadate ion, preferably the cation of an alkali metal, particularly sodium, and A denotes as anion associated with the ammonium salt, preferably the chloride, nitrate or sulfate ion.

In advantageous embodiment of the process according to the invention, the quantity of ammonium salt to add into the solution is such that after precipitation of vanadium, the excess which has not reacted with vanadate and expressed in moles of ammonium ions, is not higher than 6 moles of ammonium ions, preferably 4 moles of ammonium ions for one mole of molybdenum which is contained in the supernatant.

The excess of ammonium salt which has not reacted with the vanadium is to be found in liquid phase with the molybdenum in the supernatant and the above values of 4 and 6 of ammonium ions for one mole of molybdenum correspond to the values above which the molybdenum contained in the supernatant might precipitate.

When the amount of ammonium to add into the solution is expressed with respect to vanadium, it corresponds to at least the stoichiometric necessary quantity and advantageously to a proportion from about 20 to about 61, preferably from about 40 to about 61, this proportion being expressed in moles of ammonium salt with respect to one mole of vanadium.

Generally speaking, the initial concentration of molybdenum of the treated solutions is about 1 to about 4 moles of molybdenum for one liter of solution.

The concentration of the ammonium salt solutions applied is advantageously from about 2 to about 6, preferably from about 4 to about 6 moles of ammonium ions per liter of solution.

A solid-liquid (SL2) separation then enables the recovery, on the one hand, of a liquid phase containing the molybdenum and on the other hand of a solid phase containing the vanadium.

The liquid phase, which contains essentially molybdenum in the form of molybdate, can contain ammonium salts. The pH of this liquid phase may be from about 8 to about 9.

To recover the molybdenum from this liquid phase, under conditions such that the molybdenum obtained is of suitable purity for possible metallurgical applications, one may resort, for example, to acidification of this liquid phase, preferably to a pH of value comprised between 1 and about 2. If necessary, an additional amount of ammonium salt is added, particularly in the form of NH$_4$A', A' having the below indicated meaning, in so far this would be necessary to produce the complete precipitation of molybdenum into ammonium tetramolybdate. The molybdenum in the state of a soluble salt is then converted into insoluble ammonium tetramolybdate according to the reactions:

$$X'_2MoO_4 + 2HA' \longrightarrow H_2MoO + 2X'A'$$

$$4H_2MoO_4 + 2NH_4A' \longrightarrow (NH_4)_2Mo_4{}_{13} + 2HA' + 3H_2O \downarrow$$

in which:

X' denotes the cation associated with molybdate ion, advantageously the cation of an alkali metal such as sodium, and is preferably identical with X defined above;

A' denotes the anion associated with the H+ ion, advantageously the chloride, nitrate or sulfate ion, and is preferably identical with A defined above.

In a preferred embodiment of the process according to the invention, X is identical with X' and A is identical with A'.

It is possible to recover the molybdenum particularly in the form of oxide by carrying out, for example, roasting after a solid-liquid (SL3) separation between the ammonium tetramolybdate and the mother liquors. The solid obtained on emerging from this separation is washed, dried and roasted at 400° C. The reaction according to which the ammonium tetramolybdate is converted into molybdenum oxide is written:

$$(NH_4)_2Mo_4O_{13} \xrightarrow[400°C.]{} 4MoO_3 + 2NH_3\uparrow + H_2O\uparrow$$

When the initial solution contains phosphorus in the phosphate state particularly alkaline such as sodium, besides the ammonium salt, a magnesium salt is added, and the amounts of these two salts must be sufficient to precipitate the whole not only of the vanadium but also of the phosphorus, respectively in the form of solid ammoniaco-magnesium phosphate and ammonium vanadate.

The addition of the magnesium salt is carried out after adjustment of the pH, if the latter is necessary, before or after the addition of the ammonium salt.

Advantageously, the magnesium salt is added at the same time as the ammonium salt, particularly for the following reason: the colloidal precipitate of ammoniaco-magnesium phosphate, which is usually difficult to extract from a solution, is fixed on the vanadium precipitate when the precipitation of the phosphorus and the vanadium is done almost simultaneously, which facilitates the extraction thereof.

The magnesium salt used is advantageously constituted by magnesium sulfate.

Instead of the magnesium salt, another compound of magnesium such as magnesium oxide may also be used.

The proportion of magnesium salt to be added, at least equal to the stoichiometrically necessary amount, is advantageously comprised of between 1.8 and about 10, preferably between about 3.6 and about 7.2, this proportion being expressed in moles of magnesium salt with respect to a mole of phosphorus.

The concentration of the magnesium salt applied is advantageously from about 0.2 to about 0.1, preferably from about 0.04 to about 0.08 moles of magnesium ions per liter of solution.

In a preferred embodiment of the invention, the quantity of ammonium salt to add into the solution is such that after precipitation of vanadium, the excess which has not reacted with vanadate and expressed in moles of ammonium ions, is not higher than 4 moles of ammonium ions, preferably 3 moles of ammonium ions for one mole of molybdenum which is contained in the supernatant.

The excess of ammonium salt which has not reacted with the vanadium is to be found in liquid phase with the molybdenum in the supernatant and the above values of 4 and 3 of ammonium ions for one mole of molybdenum correspond to the values above which the molybdenum contained in the supernatant might precipitate, when the solution contains phosphorus.

When the amount of ammonium to add into the solution is expressed with respect to vanadium, it corresponds advantageously from about 20 to about 61, preferably from about 40 to about 61, expressed in moles of ammonium salt relative to one mole of vanadium. These values are calculated with respect to the vanadium, considering that the phosphorus can be neglected in the calculations, since it only represents a very low percentage by weight (of the order of 2 to 3%) with respect to the vanadium.

The concentration of ammonium salt applied is advantageously comprised from about 2 to about 6, preferably from about 4 to about 6 moles of ammonium ions per liter of solution.

The ammonium vanadate and the ammoniaco-magnesium phosphate may then be separated from one another by selective redissolution of the ammonium vanadate at a temperature of about 90° C. or more, followed by solid-liquid separation (SL4). Under these conditions, the ammoniaco-magnesium phosphate remains insoluble and the ammonium vanadate passes into solution.

Advantageously the solution of ammonium vanadate is then hydrolysed in acid medium, which results in the production of vanadic acid, then of vanadium pentoxide which then precipitates. The corresponding chemical reaction may be written:

$$NH_4VO_3 + H^+ \longrightarrow HVO_3 + NH_4^+$$

$$2HVO_3 \longrightarrow V_2O_5 + H_2O \downarrow$$

A solid-liquid (SL5) separation between the vanadium pentoxide precipitate and the solution still containing vanadic acid and which can contain sodium salts, can then be carried out.

The $V_2O_5$ precipitate may be subjected to melting at 700° C.

When the initial solution also includes uranium, in the state of soluble uranate, it is freed from this uranium particularly by precipitation of the latter in the form of a solid uranate precipitate, advantageously by adjustment of the pH of the initial solution to a value preferably of at least about 12.5–13.5.

The uranate contained in the initial solution generally is the uranate of an alkali metal, such as sodium.

Advantageously, a base such as NaOH may be used to adjust the pH of the initial solution to the value of about 12.5–13.5, at which value the uranate precipitates.

To separate the precipitated uranium from the vanadium and from the molybdenum remaining in solution, a solid-liquid separation (SL1) can be carried out.

The initial solution can also contain phosphorus in the form of phosphate. In this case, after an adjustment of pH to a value of about 12.5–13.5, the phosphorus occurs in solution with the molybdenum and vanadium, the uranium passing into the solid phase.

The initial solution containing vanadium, molybdenum and which can contain phosphorus or uranium or both at the same time can be obtained from a solid-liquid mixture of which the vanadium, the molybdenum, the phosphorus and the uranium have been solubilised.

This solubilisation can be carried out in the course of a step consisting advantageously of an alkaline treatment, particularly by means of a carbonate capable of solubilising the molybdenum, the vanadium, the phosphorus and the uranium.

As carbonate, the carbonate of an alkali salt, such as potassium or sodium is advantageously used, the sodium carbonate being preferred.

This alkali treatment is advantageously carried out at a temperature from about 50° C. to about 80° C., for a period of about 4 hours to about 8 hours.

The solid-liquid mixture is preferably formed into paste or mud. The quantity ratio between the solid and liquid of this solid-liquid mixture is advantageously comprised between about 3 and about 4.

The initial solution can also contain sulfur which is also found in the state of a solid salt after the alkali treatment.

The amount of carbonate to be added varies according to the respective contents of the various elements.

To fix ideas, it is indicated that the proportion of carbonate is generally from about 1 to about 16, preferably from about 3 to about 14, expressed in moles percent of carbonate ions relative to the total amount by weight of vanadium, molybdenum, phosphorus, uranium and sulfur.

When sodium carbonate is used, the amount of sodium carbonate added varies from about 400 to about 700 kg per ton of solid in the solid-liquid mixture for the concentrations of ions which are desired and encountered.

In the preferred embodiment according to the invention, and which has been previously envisaged, all the elements contained in the solid-liquid mixture, particularly the uranium, are solubilised, which enables the liberation of the latter to be facilitated practically entirely within the solution whilst facilitating its recovery if it is reprecipitated in uranate form, by adjustment of the pH to a value of about 12.5–13.5.

Under these conditions, generally, between about 95 and about 99% of the molybdenum and between about 80 and about 95% of the vanadium, are solubilised.

When the initial solution is derived from a solid-liquid mixture containing molybdenum, vanadium, uranium and which can contain phosphorus and sulfur, instead of solubilising the whole of the abovesaid elements, it is possible to remove the uranium directly, which occurs in solid form.

The liquid effluents emerging from the solid-liquid separations (SL3) and (SL5) are respectively substantially solutions containing small amounts of ammonium molybdate and vanadic acid; they can also contain sodium salts.

By the action particularly of lime (Ca(OH)$_2$), calcium molybdate and calcium vanadate are precipitated which could be recycled within the frame of the alkaline processing.

For a solid-liquid (SL6) separation, it is possible to separate the abovesaid precipitate from the liquid phase.

This liquid phase, which is denoted by effluent liquor K, can be subjected to one of the two following treatments:

evaporation of a part of the liquor to completely regenerate the ammonia, which could be used to manufacture the ammonium salt necessary for the process, and crystallisation of the sodium salts;

ionic exchange of a cationic resin to reconvert the sodium salts into carbonate necessary for the process.

When the initial solution is derived from a solid-liquid mixture, the whole of the process according to the invention can include the following successive steps:

addition to the solid-liquid mixture, of a carbonate, notably alkaline, capable of solubilising the molybdenum, the vanadium, the phosphorus and the uranium;

adjustment of the value of the pH to about 12.5-13.5 by the addition of a base and the production of a solid precipitate of uranate, the molybdenum, the phosphorus and the vanadium remaining in the liquid phase;

solid-liquid (SL1) separation in which the uranium is obtained in the solid phaes whilst the molybdenum, the vanadium and the phosphorus remain in the liquid phase, the latter being then liable to be concentrated;

adjustment, if necessary, of the pH of the above said solution containing the molybdenum, the vanadium and the phosphorus to a value of about 11;

addition of an ammonium salt of a magnesium salt in sufficient amounts to precipitate the whole of the vanadium in solid ammonium vanadate form and the whole of the phosphorus in solid ammoniaco-magnesium phosphate form, the molybdenum remaining in the soluble state;

solid-liquid separation (SL2) providing a solid phase which contains the vanadium and the phosphorus, the molybdenum being recovered in the liquid phase;

solid-liquid separation (SL4) between the vanadium and the phosphorus, after having carried out hot redissolution of the vanadium precipitate, the phosphate remaining insoluble.

The initial solution can also come from a solid-liquid mixture obtained following the treatment of a uraniferous ore containing molybdenum, vanadium and possibly phosphorus and sulfur.

The solid-liquid mixture can finally have been obtained from effluent "concentrates", themselves obtained after extraction of the uranium, from uraniferous liquors such as those obtained from uranium ores by acid or alkaline treatment of the latter ones.

According to a preferred embodiment of the invention, the concentration of the molybdenum of the initial solution expressed with respect to the molybdenum as a metal, is about 10% to about 40%, for instance of about 30% to about 35%.

According to a preferred embodiment of the invention, the concentration of vanadium of the initial solution expressed with respect to vanadium as a metal, is about 1% to about 15%, for instance of about 1 to about 2.5%.

According to another embodiment of the invention, when the initial solution contains phosphorus, the concentration of phosphorus expressed with respect to $P_2O_5$, is comprised between about 0.1% to about 5%, for instance of about 0.1% to about 2% by weight.

According to another embodiment of the invention, when the initial solution contains calcium, the concentration of calcium expressed with respect to CaO, is comprised between about 15% to about 30%, for instance about 15% to about 25% by weight.

Below a preferred embodiment is described which can be considered as a base for the examples and which is illustrated by the diagram of the single FIGURE.

In this embodiment, the initial solution can come from "crude" concentrates which are obtained after processing a uraniferous ore containing at the same time vanadium, molybdenum, phosphorus and sulfur.

The initial solution contains molybdenum and vanadium, particularly uranium and phosphorus and possibly sulfur, carbon, silica and calcium, the respective proportions of these various elements being advantageously the following:

the concentration of molybdenum in terms of molybdenum metal is from about 10% to about 40%, for example from about 30 to about 35% by weight;

the concentration of vanadium in terms of vanadium metal is from about 1% to about 15%, for example from about 1 to about 2.5% by weight;

the concentration of uranium in terms of uranium metal is comprised from about 0.5% to about 8%, for example from about 0.5 to about 3% by weight;

the concentration of phosphorus in terms of $P_2O_5$ is comprised from about 0.1% to about 5%, for example from about 0.1% to about 2% by weight;

the concentration of sulfur in terms of $SO_3$ is comprised from about 1% to about 20%, for example from about 1% to about 5% by weight;

the concentration of carbon in terms of $CO_2$ is comprised from about 1% to about 10%, for example from about 1% to about 5% by weight;

the concentration of silicon in terms of $SiO_2$ is comprised from about 0.2% to about 5%, for example from about 0.2% to about 2% by weight;

the concentration of calcium in terms of CaO is comprised fromm about 15% to about 30%, for example from about 15% to about 25% by weight; it being understood that the molybdenum, the vanadium, the uranium, the phosphorus, the carbon, the silicon and calcium occur, in the crude concentrate, in the form of salts, of oxides or of complexes, and not only in the forms with respect to which the concentrations are expressed.

Such a concentrate can be obtained for instance from uranium extraction liquors obtained from ores and according to known methods.

By means of the treatment of the "crude" concentrates by the process according to the invention, the molybdenum and the vanadium are recovered. Five steps are distinguished in the evolution of the process, namely:

(a) solubilising the molybdenum and vanadium, (b) Removal of the phosphorus and molybdenum-vanadium separation;

(c) production of the molybdenum concentrate;

(d) production of the vanadium concentrate;

(e) treatment of the effluents.

Diagram 1 is intended to illustrate the evolution of the above indicated process.

(a) Solubilising the molybdenum and the vanadium:

The "crude" concentrates defined above are previously "made into paste", that is to say reduced to a mud, which is constituted by a solid-liquid mixture in which the ratio liquid-solid (by weight) can be comprised from about 3 to about 4.

Then an alkaline treatment is carried out on the "crude" concentrates, for example by means of sodium carbonate $Na_2CO_3$, at a temperature comprised from about 50° C. to about 80° C., for a period from about 4 to about 8 hours.

In diagram 1, the reaction vessel is shown at (2), where the alkaline processing takes place, the crude concentrates being introduced according to (1) and the sodium carbonate being introduced according to (3).

In the course of this alkaline treatment, the uranium, vanadium and the molybdenum are solubilised in the form of their sodium salts, according to the following reactions:

$$CaU_2O_7 + 7Na_2CO_3 + 3H_2O \longrightarrow$$
$$2Na_4UO_2(CO_3)_3 + CaCO_3 + 6NaOH \downarrow$$

$$CaMoO_4 + Na_2CO_3 \longrightarrow Na_2MoO_4 + CaCO_3 \downarrow$$

$$Ca(VO_3)_2 + Na_2CO_3 \longrightarrow 2NaVO_3 + CaCO_3 \downarrow$$

The calcium sulfate is treated according to the reaction:

$$CaSO_4 + Na_2CO_3 \longrightarrow Na_2SO_4 + CaCO_3 \downarrow$$

The phosphorus is solubilized according to the reaction:

$$Ca_3(PO_4)_2 + 3Na_2CO_3 \longrightarrow 2Na_3PO_4 + 3CaCO_3 \downarrow$$

The sulfur is substantially in the form of sodium sulfate.

The amount of sodium carbonate added to carry out the alkaline treatment is comprised from about 400 to about 700 kg per ton of "crude" concentrates processed.

This alkaline processing has the advantage of making accessible all the elements contained in the solid state in the crude concentrates by solubilising them. It is then easier to remove the uranium by reprecipitating it, the whole of the uranium than occurring by means of this precipitation in the form of an accessible precipitate. To remove the uranium, the value of the pH which is about 9 is brought to about 12.5–13.5, which has the result of reprecipitating the uranium in the form of sodium uranate. The precipitation reaction is the following:

$$2Na_4UO_2(CO_3)_3 + 6NaOH \rightarrow Na_2U_2O_7 + 6Na_2CO_3 + 3H_2O$$

The uranium can then be recovered later.

In the diagram 1, there is shown at (5) the precipitation of the uranium after addition along (4) of the alkaline hydroxide, or alkaline-earth hydroxide to increase the value of the pH.

By a solid-liquid separation (SL1), a part of the uraniferous solid residue is obtained on the one hand, and a liquor is obtained on the other hand.

In diagram 1, is shown by (6) the uraniferous solid residue obtained following the solid-liquid separation and by B the liquor obtained at this stage of the process according to the invention. The rest of the description, in the abovesaid liquor is denoted by "liquor B".

The composition of the liquor B obtained as has just been indicated, is given below. This composition is expressed in gram per liter, respectively with respect to molybdenum metal, vanadium metal, uranium metal, phosphorus in the form of $P_2O_5$, carbon-dioxide and soda.

| Composition of liquor B | |
|---|---|
| Mo | between 50 and 90 g/l |
| V | between 1 and 30 g/l |
| U | between 0.05 and 2 g/l |
| $P_2O_5$ | between 0.05 and 0.3 g/l |
| $CO_2$ | between 5 and 20 g/l |
| NaOH | between 5 and 15 g/l |

(b) Removal of the phosphorus and molybdenum-vanadium separation

The above defined liquor B can be concentrated which facilitates the subsequent operations.

In diagram 1, there is shown in a reaction vessel (8) the concentration by evaporation of the liquor B.

The concentrated liquor obtained from the liquor B will be denoted below by "liquor B'".

| Composition of liquor B' (the content for each element or compound is as for B expressed in g/l) | |
|---|---|
| Mo | between 130 and 200 g/l |
| V | between 2.5 and 70 g/l |
| U | between 0.1 and 4 g/l |
| $P_2O_5$ | between 0.15 and 0.8 g/l |
| NaOH | between 20 and 35 g/l |

From the liquor B', the molybdenum-vanadium separation and the removal of phosphorus are carried out in a single stage.

For this, procedure is as follows:

the pH solution is adjusted possibly if necessary to a value of about 11;

an amount of ammonium salt $NH_4A$ is added sufficiently to convert the whole of the vanadium into ammonium vanadate;

a magnesium salt is added such as magnesium sulfate.

The vanadium then precipitates in the form of ammonium vanadate according to the reaction:

$$NaVO_3 + NH_4A \longrightarrow NaA + NH_4VO_3 \downarrow$$

The phosphorus precipitates in the form of ammoniaco-magnesium phosphate according to the reaction:

$$Na_3PO_4 + MgSO_4 + NH_4A \longrightarrow$$

-continued $$NH_4MgPO_4 + Na_2SO_4 + NaA$$ 

Preferably, the ammonium salt and the magnesium salt are added simultaneously. The proportion of ammonium salt applied (in mole % with respect to weight of the vanadium and the phosphorus) is comprised from about 40 to about 120.

In diagram 1, the reaction vessel is shown at 12 in which the precipitation of the ammonium vanadate of the ammoniaco-magnesium phosphate takes place. The possible addition of acid in order to adjust the pH to a value of 11 is shown at (10), whilst the introduction of the ammonium salt $NH_4A$ is shown at (9), the introduction of the magnesium salt being indicated by (11).

The precipitate of ammonium vanadate and of ammoniaco-magnesium phosphate is shown at (13).

As for the molybdenum, it remains dissolved in the liquor denoted in the following by "liquor D" and shown in the diagram 1 by D.

The precipitate can then be separated from the liquor D containing the molybdenum, by means of a solid-liquid (SL2) separation.

The respective compositions of the vanadium precipitate and of phosphorus and of the liquor D are the following:

| Composition of the precipitate containing the vanadium and the phosphorus (expressed in % in weight) | |
| --- | --- |
| V | between 30 and 70% |
| $P_2O_5$ | between 0.1 and 5% |
| Mo | between 0 and 2% |
| Composition of the liquor D (expressed in g/l) | |
| Mo | between 125 and 200 g/l |
| V | between 0.1 and 1 g/l |
| $P_2O_5$ | between 0.05 and 0.25 g/l |

(c) Production of the molybdenum concentrate

The liquor D contains essentially molybdenum in the state of sodium molybdate and can contain ammonium salt, if the ammonium salt $NH_4A$ added in the preceding step, has been added in excess.

When the solution contains ammonium salt, the pH of the latter is from about 8 to about 9.

By acidification to a pH of about 1 to about 2, by means of an acid HA', the sodium molybdate is converted into insoluble ammonium tetramolybdate according to the reactions:

$$Na_2MoO_4 + 2HA' \longrightarrow H_2MoO + 2NaA'$$

$$4H_2MoO_4 + 2NH_4A \longrightarrow (NH_4)_2Mo_4O_{13} + 2HA + 3H_2O$$ 

Preferably, in the acid HA', the anion A' associated with H+ is identical with the anion associated with the ammonium ion $NH_4^+$, in the ammonium salt used to precipitate the vanadium and the phosphorus. The introduction of too many foreign ions is thus avoided.

The anion A' is advantageously constituted by a nitrate, a chloride or a sulphate.

On diagram 1, is shown at (14) the reaction container in which the acidification takes place to a pH of about 1 to about 2 after the addition of the acid HA' along (15).

A solid-liquid separation (SL3) is then carried out, to separate the ammonium molybdate from the mother liquors. The solid is washed, dried and roasted at 400° C. The ammonium molybdate is converted into molybdenum oxide with the release of $NH_3$ according to the reaction:

$$(NH_4)_2Mo_4O_{13} \longrightarrow 4MoO_3 + 2NH_3\uparrow + H_2O\uparrow$$

The composition of the product obtained, expressed in % by weight, is the following:

| Mo | between 60 and 70% |
| --- | --- |
| V | between 0.1 and 0.5% |
| P | between 0.01 and 0.05% |
| S | between 0.01 and 0.08% |
| Na | between 0.5 and 2% |

The mother liquors constitute a liquor F containing essentially in the dilute state, ammonium molybdate and sodium salt.

In diagram 1, the solid obtained following the solid-liquid separation (SL3) is indicated on (16), the washing being carried out along (17) and the roasting being carried out at (18). The molybdenum oxide obtained following the roasting indicated at (32) and the ammonia released in the course of the reaction is shown at (19).

(d) Production of vanadium concentrate

The solid emerging from this solid-liquid separation (SL2) is taken up again to recover the vanadium. To do this, the procedure is as follows:

the ammonium vanadate precipitate is dissolved selectively in water, at a temperature of about 90° C. or more, the ammoniaco-magnesium phosphate remaining in the solid state.

The liquor H thus obtained contains essentially ammonium vanadate.

In diagram 1, the solid obtained on emerging from the solid-liquid separation (SL2) is indicated at (13). The solid is then taken up again at (20) to undergo selective redissolving of the ammonium vanadate in a container shown at (21) at a temperature of about 90° C.

Then a solid-liquid separation (SL4) is then carried out, between the ammoniaco-magnesium phosphate and the liquor H, then it is hydrolysed in an acid medium to obtain the vanadium pentoxide which precipitates according to the following reaction diagram:

$$NH_4VO_3 + H^+ \longrightarrow HVO_3 + NH_4^+$$

$$2HVO_3 \longrightarrow V_2O_5 + H_2O$$ 

In diagram 1 is indicated by (22) the solid ammoniaco-magnesium phospate obtained following the solid-liquid separation (SL4) and by (23) the reaction vessel where the hydrolysis takes place after the addition of acid at (24).

Then a solid-liquid (SL5) separation is carried out between the liquor J (containing the vanadic acid and the ammonium salts) and the vanadium pentoxide precipitate.

The solid product obtained is brought to a temperature of about 700° C. (26) to obtain fused $V_2O_5$.

The contents of the solid product in vanadium, molybdenum, phosphorus and sulfur are respectively (expressed in % by weight):

| | |
|---|---|
| V | between 40 and 56% |
| Mo | between 0.5 and 2% |
| P | between 0.05 and 0.1% |
| S | between 0.05 and 0.1% |

In diagram 1, the pentoxide precipitate is shown at (25) while the liquor J is shown by J. At (26), is shown the fusion of the solid product at 700° C. leading to the production of fused $V_2O_5$ (27).

(e) Processing of the effluents

The liquid effluents (F and J) emerging from the solid-liquid (SL3) and (SL5) separations are respectively essentially solutions of ammonium molybdate and vanadic acid; they also contain sodium salts and ammonium salts.

By the action of lime $Ca(OH)_2$, the calcium molybdate and the calcium vanadate are precipitated and are recycled in the field of the alkaline processing and a liquor K is obtained.

The precipitate constituted by the calcium molybdate and the calcium vanadate is separated from the liquor K by a separation (SL6).

In diagram 1, is indicated at (29) the reaction container wherein the recycling takes place at (29) of the precipitate (30) constituted by the calcium molybdate and the calcium vanadate after the addition of the lime at (28).

The remaining liquor K can be subjected to one of the two following treatments:

evaporation of a part to regenerate the ammonia entirely, which will be used to manufacture the ammonium salt necessary for the process, and crystallisation of the sodium salts;

ion exchange on a cationic resin to reconvert the sodium salts into carbonate necessary for the process.

In diagram 1, the two treatments which can be applied to the liquor K are shown by (31).

The principle of separation of the molybdenum and the vanadium leading to the purification of these two elements, is the subject of the following examples.

EXAMPLE 1

The "crude" concentrates treated within the field of this example, by the process according to the invention, have the following composition (expressed in % by weight):

| | |
|---|---|
| Mo | 30.4% |
| V | 1.54% |
| U | 2.95% |
| $P_2O_5$ | 1.04% |
| $SO_3$ | 2.43% |
| $CO_2$ | 4.5% |

These "crude" concentrates, defined above, are previously formed into paste, which paste is constituted by a solid-liquid mixture in which the ratio between the liquid and the solid is about 3.5 m3 per ton.

These crude concentrates are subjected to alkaline treatment by means of sodium carbonate ($Na_2CO_3$) used in the proportion of about 600 kg per ton of concentrate as defined above, at a temperature of about 70° C., for a period of about 6 hours.

Then, to the paste constituted principally by calcium molybdate, sodium hydroxide is added in the ratio of about 30 kg per ton, of concentrate as defined above, to increase the value of the pH which precipitates the uranium in uranate form.

Then a solid-liquid (SL1) separation is carried out, as the result of which a liquor denoted by liquor B, and a uraniferous solid residue are obtained.

The composition of the liquor B obtained, expressed in g/l, is given below:

| | |
|---|---|
| Mo | 82.2 g/l |
| V | 2.6 g/l |
| U | 0.068 g/l |
| $P_2O_5$ | 0.019 g/l |
| $CO_2$ | 15.7 g/l |

To facilitate the subsequent operations, the above defined liquor B is concentrated by evaporation to give liquor B', whose composition, expressed in g/l is as follows:

| | |
|---|---|
| Mo | 157 g/l |
| V | 4.8 g/l |
| U | 0.13 g/l |
| $P_2O_5$ | 0.04 g/l |

This liquor B' is treated according to the process of the invention to obtain the separation of the molybdenum and the vanadium, and to eliminate the phosphorus.

The treatment of the liquor B' is carried out at a temperature of about 36° C. The pH of the liquor B' is adjusted by means of sulfuric acid, the latter being used in the proportion of about 106 kg per ton of "crude" concentrate defined above. Magnesium sulphate ($MgSO_4,7H_2O$) is then added in the proportion of about 4.9 kg per ton of "crude" concentrate defined above and ammonium chloride ($NH_4Cl$) in the proportion of about 410 kg per ton of "crude" concentrate defined above.

The reaction lasts one hour. A precipitate of ammonium vanadate and of ammoniaco-magnesium phosphate is obtained, whilst the molybdenum remains dissolved in the liquor denoted by liquor D and whose pH is about 8.30 and temperature is about 30° C.

The yield of the precipitation is about 83%.

The composition of the precipitate containing the vanadium and the phosphorus, resulting from the solid-liquid (SL2) separation is the following (expressed in % by weight):

| | |
|---|---|
| V | 3.03% |
| Mo | 1.01% |
| U | 0.04% |
| $P_2O_5$ | 0.0014% |

The ammonium vanadate precipitate is dissolved selectively in water, at a temperature of about 90° C., whilst the ammoniaco-magnesium phosphate remains in the solid state. The ammoniaco-magnesium phosphate is separated from the liquor H containing the ammonium vanadate by solid-liquid (SL4) separation. Then the liquor H is acidified to a pH of about 1.5 by the addition of sulfuric acid in the proportion of about 20 kg per ton of above defined "crude" concentrate.

The hydrolysis of the liquor H containing the ammonium vanadate at 90° C. for 4 hours leads to the vanadium pentoxide which precipitates.

Then by means of a solid-liquid (SL5) separation, the vanadium pentoxide precipitate is separated from the liquor containing the vanadic acid, and ammonium salts. By bringing the vanadium pentoxide to a temperature of about 700° C., fused $V_2O_5$ is obtained.

The composition of this compound is as follows:

|   |   |
|---|---|
| V | 54% |
| Mo | 1.50% |
| P | traces |

The liquor D obtained as a result of the solid-liquid (SL2) separation is acidified to a pH of about 1.5 by means of pure hydrochloric acid, used in the proportion of about 199 kg per ton of "crude" concentrate defined above.

The treatment lasts 4 hours and takes place at a temperature of about 24° C. In this was a precipitate of insoluble ammonium tetramolybdate of the formula:

$(NH_4)_2Mo_4O_{13}$ is obtained which is separated by means of a solid-liquid (SL3) separation.

The solid obtained is washed, dried and roasted at 400° C., following which the ammonium tetramolybdate is converted into molybdenum oxide, of the following composition (expressed in % by weight):

|   |   |
|---|---|
| Mo | 67.9% |
| V | 0.28% |
| P | 0.028% |
| S | 0.036% |

EXAMPLE 2

In this example, the treatment of a "crude" concentrate, as has been indicated in example 1, leads to the production of a liquor B', whose analysis is as follows:

|   |   |   |
|---|---|---|
| Mo | 119.7 | g/l |
| V | 3.8 | g/l |
| P | 0.28 | g/l |
| S | 1.97 | g/l |
| pH | 9.45 | |

The molybdenum is separated from the vanadium by a treatment according to the invention, by adding magnesium sulphate $MgSO_4, 7H_2O$, in the proportion of about 3.15 kg per m3 of liquor B' defined above and ammonium chloride in the proportion of about 214 kg per m3 of liquor B' defined above (4 moles per liter).

The reaction takes place at a temperature of about 30° C., during about 2 hours.

The precipitate of ammonium vanadate and ammoniaco-magnesium phosphate obtained has the following composition (the precipitation yield is about 86%):

|   |   |
|---|---|
| V | 50% |
| Mo | 4.49% |
| P | 0.075% |
| S | 0.159% |

The molybdenum remains soluble in the liquor (liquor D) obtained following the above indicated precipitation.

The liquor D is acidified by means of pure hydrochloric acid used in a proportion of about 91 kg per m3 of the above defined "crude" concentrate, for a duration of about 4 hours, at a temperature of about 30° C., the pH of the solution being about 1.49.

In the course of this acidification, the sodium molybdate is converted into insoluble ammonium tetramolybdate by precipitation, the yield of the precipitation being about 98.49%. The analysis of the molybdenum oxide obtained following the washing, drying and roasting at about 400° C. is as follows:

|   |   |
|---|---|
| Mo | 66.9% |
| P | 0.014% |
| S | 0.01% |

As is self-evident and as emerges moreover from the foregoing the invention is in no way limited to those modes of application and embodiments which have been more especially envisaged; on the contrary it encompasses all modifications.

We claim:

1. Process for separating and purifying molybdenum from an initial solution containing molybdenum, vanadium and phosphorus, in the form of their metal salts, the amount of molybdenum being greater than five moles of molybdenum for one mole of vanadium, comprising contacting said initial solution at a pH of at least 11 with excesses of an ammonium salt with a magnesium salt, the respective amounts of ammonium and of magnesium salts being sufficient to precipitate the whole of the phosphorus and the vanadium respectively, as solid salts of ammoniacomagnesium phosphate and of ammonium vanadate, with the proviso that the concentration of any unreacted ammonium salt present after precipitation of the ammonium vanadate be insufficient to cause precipitation of molybdenum from said solution, and separating the resulting liquid phase containing the molybdenum from the resulting solid phase containing the vanadium and phosphorus.

2. Process according to claim 1, wherein the vanadium is recovered from the solid phase, by selective hot redissolution of the vanadium, whilst the phosphorus remains in solid phase, followed by a solid-liquid separation.

3. Process according to claim 2, wherein the redissolution is carried out at a temperature of about 90° C. or more and the liquid phase emerging from the solid-liquid separation according to claim 2, and containing the ammonium vanadate is subjected to acid hydrolysis to form $V_2O_5$.

4. Process according to claim 1, wherein the initial solution is derived from a solid-liquid mixture comprising from about 0.1 to about 5% by weight of phosphorus expressed with respect to $P_2O_5$.

5. Process according to claim 1, wherein the initial solution is derived from a solid-liquid mixture comprising from about 0.1 to about 2% by weight of phosphorus expressed with respect to $P_2O_5$.

6. Process according to claim 1, wherein the initial molar concentration of the solution in molybdenum is from 1 to 4 moles per liter.

7. Process according to claim 1, wherein in the concentration of ammonium salt is not higher than 4 moles of ammonium per mole of molybdenum.

8. Process according to claim 1, wherein the concentration of ammonium salt per liter of initial solution is from about 2 to about 6 moles per liter.

9. Process according to claim 1, wherein the concentration of ammonium salt per liter of initial solution is from about 4 to about 6.

10. Process according to claim 1, wherein the magnesium salt is added in the proportion from about 1.8 to about 10 moles per mole of phosphorus.

11. Process according to claim 1, wherein the magnesium salt is added in the proportion from about 3.6 to about 7.2 moles per mole of phosphorus.

12. Process according to claim 1, wherein the concentration in moles of magnesium ions per liter of initial solution is comprised from about 0.02 to about 0.1.

13. Process according to claim 1, wherein the concentration in moles of magnesium ions per liter of initial solution is comprised from about 0.04 to about 0.08.

14. Process according to claim 1, wherein the separated liquid phase is acidified to a pH between about 1 and about 2 to precipitate the molybdenum as insoluble ammonium tetramolybdate and recovering said ammonium tetramolybdate.

15. Process according to claim 14, wherein the the acid employed in said acidification is an acid whose anion is identical with the anion of the ammonium salt added to the initial solution.

16. Process according to claim 1, wherein the acid is selected from hydrochloric sulfuric and nitric acid.

17. Process according to claim 1, in which the initial solution also contains uranium in the state of uranate, wherein the uranium is previously separated from the vanadium, from the molybdenum and from the phosphorus in the form of a solid uranate precipitate, by adjustment of the pH to a value of at least about 12.5-13.5 by means of base.

18. Process according to claim 17, wherein uranium is in the state of an uranate of an alkali metal salt.

19. Process according to claim 1, wherein the initial solution, is derived from a liquid-solid mixture, wherein the molybdenum, vanadium, phosphorus and the uranium have been placed in solution in the presence of a carbonate.

20. Process according to claim 19, wherein the molybdenum, vanadium, phosphorus and the uranium have been placed in solution in the presence of an alkali carbonate.

21. Process according to claim 20, wherein the carbonate capable of solubilizing the vanadium, the molybdenum, the phosphorus and the uranium, has been used in the proportion from about 1 to about 16 moles % with respect to the vanadium, molybdenum, phosphorus and uranium, the amount of sodium carbonate varying from about 400 to 700 kg/t of solid in the solids-liquid mixture.

22. Process according to claim 1, wherein the initial solution is derived from a solid-liquid mixture comprising from about 10 to about 40% by weight of molybdenum expressed as molybdenum metal.

23. Process according to claim 1, wherein the initial solution is derived from a solid-liquid mixture comprising from about 1 to 16% by weight of vanadium expressed as vanadium metal.

24. Process according to claim 1, wherein the initial solution is derived from a solid-liquid mixture comprising from about 15 to about 30% by weight of calcium expressed as CaO.

25. Process according to claim 1, wherein the initial solution is derived from a solid-liquid mixture comprising from about 10 to about 40% by weight of molybdenum expressed with respect to molybdenum metal, from about 1 to about 15% by weight of vanadium expressed with respect to vanadium metal, from about 0.5 to about 8% by weight of uranium expressed as uranium metal, from about 0.1 to about 5% by weight of phosphorus expressed as $P_2O_5$, optionally from about 1 to about 20% by weight of sulfur optionally from about 1 to about 10% by weight of carbon expressed as $CO_2$, optionally from about 0.2 to 5% by weight of silicon expressed as $SiO_2$, optionally from about 15 to about 30% by weight of calcium expressed as CaO.

26. Process according to claim 1, wherein the initial solution is derived from a solid-liquid mixture comprising from about 30 to about 35% by weight of molybdenum expressed as molybdenum metal; from about 1 to about 2.5% by weight of vanadium expressed as vanadium metal, from about 0.5 to about 3% by weight of uranium expressed as uranium metal, from about 0.1 to about 2% by weight of phosphorus expressed as $P_2O_5$, optionally from about 1 to about 5% y weight of sulfur expressed as $SO_3$, optionally from about 1 to about 5% by weight of carbon expressed as $CO_2$, optionally from about 0.2 to 2% by weight of silicon expressed as $SiO_2$, optionally from about 15 to about 25% by weight of calcium expressed as CaO.

27. Process for separating and purifying molybdenum from an initial solution containing molybdenum, vanadium and phosphorous in the form of their metal salts and being derived from a solid-liquid mixture, the amount of molybdenum being greater than 5 moles of molybdenum for 1 mole of vanadium, comprising adding to the solid-liquid mixture an alkaline carbonate capable of solubilizing the molybdenum, phosphorous, vanadium and uranium, adjusting the value of the pH to about 12.5-13.5 by the addition of a base to precipitate solid uranate while the molybdenum, vanadium and phosphorous remain in the liquid phase, separating the solid and liquid phases to obtain a solid phase containing the uranium and a liquid phase containing the molybdenum, vanadium and phosphorous, adjusting the pH of the liquid phase to about 11, adding excesses of an ammonium salt and a magnesium salt to said liquid phase, the respective amounts of ammonium and of magnesium salts being sufficient to precipitate the whole of the phosphorous and vanadium respectively, as solid salts of ammoniacomagnesium phosphate and of amonium vanadate, with the proviso that the concentration of any reacted amonium salt present after precipitation of the amonium vanadate be insufficient to cause precipitation of molybdenum from said solution, and separating the resulting liquid phase containing the molybdenum from the resulting solid phase containing the vanadium and phosphorus.

28. Process according to claim 27, wherein the solution is derived from a solid-liquid mixture and the treatment of the solid-liquid mixture is carried out at the temperature of about 50 to about 80° C. for a period of about 4 to 8 hours.

* * * * *